United States Patent
Wu et al.

(10) Patent No.: US 10,501,325 B2
(45) Date of Patent: Dec. 10, 2019

(54) FABRICATION OF A GRAPHITE FILM BASED ON A POLYIMIDE FILM

(71) Applicant: TAIMIDE TECHNOLOGY INCORPORATION, Hsinchu County (TW)

(72) Inventors: Jia-Hao Wu, Hsinchu Hsien (TW); Yu-Chen Lai, Hsinchu Hsien (TW)

(73) Assignee: Taimide Technology Incorporation, Hsinchu County (TW)

( * ) Notice: Subject to any disclaimer, the term of this patent is extended or adjusted under 35 U.S.C. 154(b) by 295 days.

(21) Appl. No.: 15/372,026

(22) Filed: Dec. 7, 2016

(65) Prior Publication Data

US 2018/0127561 A1    May 10, 2018

(30) Foreign Application Priority Data

Nov. 10, 2016 (TW) .............................. 105136592 A

(51) Int. Cl.
  *C01B 32/205* (2017.01)
  *C08J 9/00* (2006.01)
  *C08J 9/26* (2006.01)

(52) U.S. Cl.
  CPC .......... *C01B 32/205* (2017.08); *C08J 9/0066* (2013.01); *C08J 9/26* (2013.01); *C08J 2201/044* (2013.01); *C08J 2379/08* (2013.01)

(58) Field of Classification Search
  CPC ......... C01B 32/205; C08J 9/26; C08J 9/0066; C08J 2201/044; C08J 2379/08
  See application file for complete search history.

(56) References Cited

U.S. PATENT DOCUMENTS

| 8,092,908 B2 * | 1/2012 | Ohta ........................ C09K 5/14 |
| | | 428/408 |
| 2015/0130098 A1 * | 5/2015 | Hsiang ................. C09D 179/08 |
| | | 264/29.1 |

FOREIGN PATENT DOCUMENTS

| JP | 10045931 A | 9/1998 |
| KR | 1020160007442 A | 1/2016 |

OTHER PUBLICATIONS

Office Action dated Sep. 17, 2017 in connection with Korean Application No. 10-2016-0165640, 13 pages.

* cited by examiner

*Primary Examiner* — Richard M Rump
(74) *Attorney, Agent, or Firm* — Baker & McKenzie LLP

(57) ABSTRACT

A polyimide film suitable for use in the fabrication of a graphite layer includes a polyimide derived from reaction of diamine monomers with dianhydride monomers, and a foaming agent incorporated in the polyimide. Moreover, a process of fabricating a graphite film includes providing a polyamic acid solution formed by reaction of diamine monomers with dianhydride monomers, incorporating a foaming agent into the polyamic acid solution, forming a polyimide film from the polyamic acid solution, applying a first thermal treatment so that the polyimide film is carbonized to form a carbon film, and applying a second thermal treatment so that the carbon film is converted to a graphite film.

4 Claims, 2 Drawing Sheets

FABRICATION OF A GRAPHITE FILM BASED ON A POLYIMIDE FILM

CROSS-REFERENCE TO RELATED APPLICATION(S)

This application claims priority to Taiwan Patent Application No. 105136592 filed on Nov. 10, 2016, the disclosure of which is incorporated herein by reference.

FIELD OF THE DISCLOSURE

The present disclosure relates to polyimide films, and more particularly to the fabrication of graphite films based on polyimide films.

BACKGROUND OF THE DISCLOSURE

Thin and lightweight electronic products have become a major development trend in the increasing demand of mobile devices. As electronic components have their size reduced, more efficient heat dissipation is required, especially for components such as the chip, the backlight module and the battery. Synthetic flexible graphite films can meet the high requirements of thermal conduction (its thermal conductivity is four times better than that of copper) and heat dissipation, and offer good flexibility. Accordingly, graphite films are widely used in the manufacture of mobile devices.

A graphite film having high thermal conductivity can be fabricated by performing multiple processing steps of pyrolysis and atom rearrangement to produced pure carbon atoms. These thermal treatments generally include a carbonizing process and a graphitizing process. The carbonizing process consists in pyrolyzing non-carbon elements at a temperature between 800 CC and 1300° C. The graphitizing process applies heat at a higher temperature between 2300° C. and 3000° C. so that the carbon atoms are displaced and rearranged so as to form a layer having continuous and ordered arrangement of carbon atoms. The obtained graphite film is then subjected to a rolling treatment to form a flexible graphite film, which can be used as a heat dissipation layer or electromagnetic wave shielding layer in an electronic device.

Some existing approaches propose to use polyimide films of a given thickness for fabricating graphite films of different thicknesses. The implementation of these approaches requires changing the temperature and time of the graphitizing process so as to control the thickness of the formed graphite film. However, this method requires high process controllability, which may be difficult to achieve in practice.

Therefore, there is a need for a process of fabricating a graphite film that can be more easily implemented, and overcome at least the aforementioned issues.

SUMMARY

The present application provides a polyimide film suitable for use in the fabrication of a graphite layer. The polyimide film includes a polyimide derived from reaction of diamine monomers with dianhydride monomers, and a foaming agent incorporated in the polyimide.

The present application further provides a process of fabricating a graphite film, including providing a polyamic acid solution formed by reaction of diamine monomers with dianhydride monomers, incorporating a foaming agent into the polyamic acid solution, forming a polyimide film from the polyamic acid solution, applying a first thermal treatment so that the polyimide film is carbonized to form a carbon film, and applying a second thermal treatment so that the carbon film is converted to a graphite film.

DETAILED DESCRIPTION OF THE EMBODIMENTS

Figure 1:
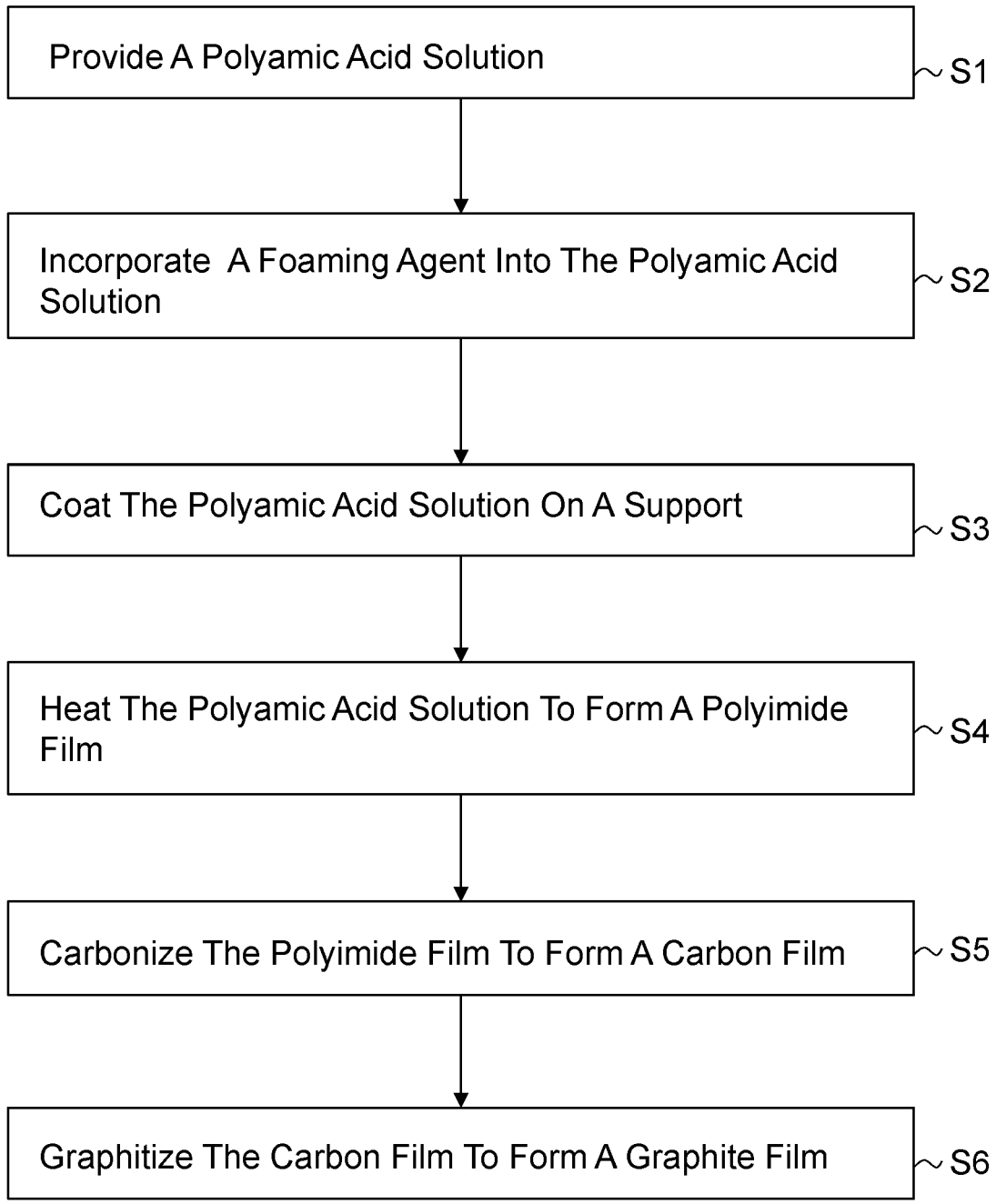
FIG. 1 is a flowchart illustrating a process of fabricating a graphite film according to an example embodiment of the disclosure.
Figure 2:
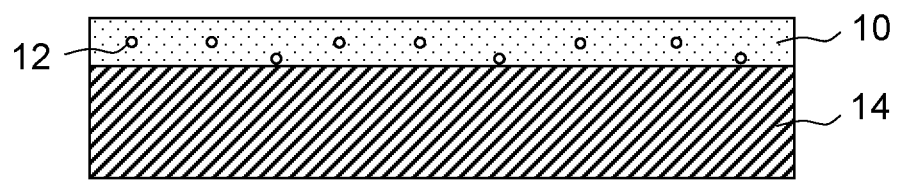
FIG. 2 is a schematic view illustrating an intermediate stage corresponding to process steps, according to an example embodiment of the disclosure.
Figure 3:
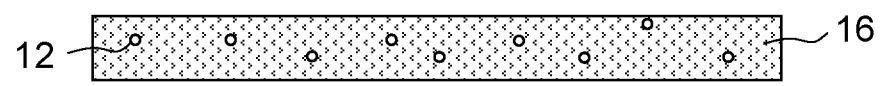
FIG. 3 is a schematic view illustrating an intermediate stage corresponding to process steps, according to an example embodiment of the disclosure.

The present application describes a polyimide film suitable for use in the fabrication of a graphite film, and a process of fabricating a graphite film based on a polyimide film. FIG. 1 is a flowchart illustrating processing steps of fabricating a graphite film from a polyimide film, and FIGS. 2-3 are schematic views illustrating intermediate stages corresponding to the process steps described in the flowchart of FIG. 1.

In initial step S1, a polyamic acid solution is provided, which contains a polyamic acid formed by reacting diamine monomers with dianhydride monomers. A foaming agent in step S2 is incorporated in the polyamic acid solution, and the polyamic acid solution in step S3 is then coated on a support. FIG. 2 illustrates a layer 10 of the polyamic acid solution with the foaming agent 12 incorporated therein coated on the support 14. The layer 10 in step S4 is then heated to form a polyimide film 16 containing the foaming agent 12, as shown in FIG. 3. The polyimide film 16 in step S5 undergoes a carbonizing step for forming a carbon film. The thermal treatment of the carbonizing step may be performed at a temperature between about 800° C. and about 1500° C. The carbon film in step S6 then undergoes a graphitizing step, whereby it is converted to a graphite film. The thermal treatment of the graphitizing step may be performed at a temperature of about 2800° C. or higher. Moreover, the graphitizing step may be performed under a reduced pressure or an atmosphere of inert gas such as argon, helium, and the like.

Examples of the diamine monomers used for forming the polyamic acid solution may include 4,4'-oxydianiline (4,4'-ODA), phenylenediamine (p-PDA), 2,2'-bis(trifluoromethyl)benzidine (TFMB), 1,3-bis(4-aminophenoxy)benzene (TPER), 1,4-bis(4-aminophenoxy)benzene (TPEQ), 2,2'-dimethyl[1,1'-biphenyl]-4,4'-diamine (m-TB-HG), 1,3'-bis(3-aminophenoxy) benzene (APBN), 3,5-diamino benzotrifluoride (DABTF), 2,2'-bis[4-(4-aminophenoxy) phenyl] propane (BAPP), 6-amino-2-(4-aminophenyl) benzoxazole (6PBOA), 5-amino-2-(4-aminophenyl) benzoxazole (5PBOA). The aforementioned diamines can be used individually or in combination. In some examples of implementation, the diamine monomers may be selected from the group consisting of 4,4'-ODA, p-PDA and TFMB.

Examples of the dianhydride monomers used for forming the polyamic acid solution may include 3,3',4,4'-biphenyltetracarboxylic dianhydride (BPDA), 2,2-bis [4-(3,4dicarboxyphenoxy) phenyl] propane dianhydride (BPADA), pyromellitic dianhydride (PMDA), 2,2'-Bis-(3,4-dicarboxyphenyl) hexafluoropropane dianhydride (6FDA), 4,4-oxydiphthalic anhydride (ODPA), benzophenonetetracarboxylic dianhydride (BTDA), 3,3',4,4'-dicyclohexyltetracarboxylic acid dianhydride (HBPDA). The aforementioned dianhydrides can be used individually or in combination. In some examples of implementation, the dianhydride monomers may be selected from the group consisting of PMDA, BPDA and BPADA.

The foaming agent incorporated in the polyamic acid solution has no carbon content, and can exemplary include boron-containing compounds or nitrogen-containing compounds. Examples of the boron-containing compound may include $LiB_4$, $NaB_6$, $KB_6$, beryllium borides, $MgB_2$, $CaB_6$, $SrB_6$, $BaB_6$, aluminum borides, $ScB_2$, ytterbic borides, lanthanum borides, boron carbides, $B_4Si$, $B_{12}Si$, $TiB_2$, zirconium borides, $HfB_2$, $ThB_4$, $ThB_6$, BN, BP, $B_{13}P_2$, VB, $VB_2$, NbB, $NbB_2$, TaB, $TaB_2$, CrB, $CrB_2$, MoB, $Mo_2B_5$, $W_2B_5$, $WB_4$, uranium borides, manganese borides, $Tc_7B_3$, rhenium borides, iron borides, ruthenium borides, osmium borides, cobalt borides, $Rh_7B_3$, iridium borides, nickel borides, $Pd_5B_2$, platinum borides and the like. Examples of the nitrogen-containing compound may include BN, AlN, GaN, $Si_3N_4$, TiN, $V_3N_5$, $Fe_3N$, FeN, $Co_3N_2$, NiN, $Ni_3N_2$, $Cu_3N$, $Na_3N$, $K_3N$, $Rb_3N$, $Cs_3N$, $Mg_3N_2$, $Ca_3N_2$, $Sr_3N_2$, $Ba_3N_2$ and the like. The aforementioned foaming agent can be used individually or in combination. In some examples of implementation, the foaming agent is boron nitride (BN).

The foaming agent is incorporated in a quantity between 0.02 wt % and 0.4 wt % based on the total weight of the polyimide film. While the carbon film is subjected to the graphitizing step at a temperature of 2000° C. or higher, boron atoms contained in the foaming agent may induce the generation of nitrogen gas. Nitrogen that may be contained in the foaming agent can also be released to produce nitrogen gas during pyrolysis of the carbon film at a temperature of 2000° C. or higher. As a result, foaming is promoted during the graphitizing step. Moreover, non-carbon elements in the foaming agent (e.g., boron) may remain in the graphite layer.

More detailed examples of fabricating polyimide films and graphite films are described hereinafter.

EXAMPLES AND COMPARATIVE EXAMPLES

Example 1

Preparation of a Polyamic Acid Solution

In 100 kg of DMAC solvent, 10 kg of 4,4'-ODA and an appropriate amount of PMDA are polymerized to form a polyamic acid solution, which has a viscosity of 1,000 cp. DMAC solvent containing 2 wt % of boron nitride as foaming agent is incorporated into the polyamic acid solution. PMDA is then added into the polyamic acid solution, so that the total weight of PMDA is 10.8 kg. The mixed solution has a viscosity of 150,000 cp.

Preparation of a Polyimide Film

A layer of the polyamic acid solution is coated on a steel belt, and is heated at a temperature of 80° C. for 30 minutes to remove most solvent. The layer of the polyamic acid solution is then heated at a temperature between 170° C. and 370° C. for 4 hours, and then subjected to a biaxial orientation to obtain a polyimide film having a thickness of 50 µm.

Preparation of a Graphite Film

The obtained polyimide film is carbonized at a temperature between 800° C. and 1300° C. to form a carbon film. Then the carbon film is graphitized at a temperature of about 2800° C. to form a foamed graphite film, which has a foaming thickness of 41 µm. Then the foamed graphite film is subjected to a rolling and pressing treatment.

The final graphite film has a thickness of 25 µm, a density of 2.14 g/cm³, a thermal diffusion coefficient of 8.23 cm²/sec, and good appearance.

Examples 2-5 and Comparative Examples 1-2

Graphite films are fabricated like in Example 1, except that the contents of boron nitride and the foaming thickness are as indicated in Table 1.

TABLE 1

|  | Foamed graphite film | | Final graphite film | | | |
| --- | --- | --- | --- | --- | --- | --- |
|  | Content of boron nitride (wt %) | Foaming thickness (µm) | Thickness (µm) | Density (g/cm³) | Thermal diffusion coefficient (cm²/sec) | Appearance |
| Example 1 | 0.02 | 41 | 25 | 2.14 | 8.23 | good |
| Example 2 | 0.05 | 47 | 25 | 2.10 | 7.85 | good |
| Example 3 | 0.10 | 60 | 25 | 2.04 | 7.51 | good |
| Example 4 | 0.20 | 103 | 25 | 1.74 | 7.09 | good |
| Example 5 | 0.40 | 185 | 25 | 1.85 | 4.33 | good |
| Comparative Example 1 | 0 | 35 | 25 | 2.19 | 8.30 | good |
| Comparative Example 2 | 0.60 | 250 | 25 | 1.60 | 3.51 | poor |

Referring to Table 1, it can be observed that an increase in the content of boron nitride can substantially promote foaming during the graphitizing step. However, excessive foaming may occur and produce poor film appearance (i.e., flaking-off phenomenon may be observed) when an excessive amount of boron nitride foaming agent is used, as observed in Comparative Example 2.

In a conventional process, the temperature conditions respectively applied in the carbonization and graphitization steps have to be modified for making graphite films of different thicknesses, which requires accurate control of the thermal treatments. In contrast, the process described herein can fabricate graphite films of different thicknesses by applying similar processing parameters of temperatures and simply need to adjust the quantity of foaming agent incorporated in the polyimide film. Since the quantity of foaming agent incorporated in the polyimide film can be accurately and easily controlled, the graphic films can be fabricated in a more cost-effective manner, and the product yield can be improved.

Realizations of the fabrication process and films have been described in the context of particular embodiments. These embodiments are meant to be illustrative and not limiting. Many variations, modifications, additions, and improvements are possible. These and other variations, modifications, additions, and improvements may fall within the scope of the disclosure as defined in the claims that follow.

What is claimed is:

1. A process of fabricating a graphite film, comprising:
   providing a polyamic acid solution formed by reaction of diamine monomers with dianhydride monomers;
   incorporating a foaming agent into the polyamic acid solution, wherein the foaming agent includes boron nitride and is incorporated in a quantity between 0.02 wt % and 0.4 wt % based on a total weight of the polyimide film;
   forming a polyimide film from the polyamic acid solution containing the foaming agent;
   applying a first thermal treatment so that the polyimide film is carbonized to form a carbon film; and
   applying a second thermal treatment so that the carbon film is converted to a graphite film.

2. The process of claim 1, wherein the diamine monomers are selected from the group consisting of 4,4'-oxydianiline (4,4'-ODA), phenylenediamine (p-PDA), 2,2'-bis(trifluoromethyl)benzidine (TFMB), 1,3-bis(4-aminophenoxy)benzene (TPER), 1,4-bis(4-aminophenoxy)benzene (TPEQ), 2,2'-dimethyl[1,1'-biphenyl]-4,4'-diamine (m-TB-HG), 1,3'-bis(3-aminophenoxy) benzene (APBN), 3,5-diamino benzotrifluoride (DABTF), 2,2'-bis[4-(4-aminophenoxy) phenyl] propane (BAPP), 6-amino-2-(4-aminophenyl) benzoxazole (6PBOA) and 5-amino-2-(4-aminophenyl) benzoxazole (5PBOA), and the dianhydride monomers are selected from the group consisting of 3,3',4,4'-biphenyltetracarboxylic dianhydride (BPDA), 2,2-bis [4-(3,4dicarboxyphenoxy) phenyl] propane dianhydride (BPADA), pyromellitic dianhydride (PMDA), 2,2'-bis-(3,4-dicarboxyphenyl) hexafluoropropane dianhydride (6FDA), 4,4-oxydiphthalic anhydride (ODPA), and benzophenonetetracarboxylic dianhydride (BTDA), 3,3',4,4'-dicyclohexyltetracarboxylic acid dianhydride (HBPDA).

3. The process of claim 1, wherein the first thermal treatment is performed at a temperature between about 800° C. and about 1500° C.

4. The process of claim 1, wherein the second thermal treatment is performed at a temperature between about 2300° C. and about 3000° C.

* * * * *